United States Patent [19]
Tajima et al.

[11] Patent Number: 5,961,760
[45] Date of Patent: Oct. 5, 1999

[54] METHOD OF PRODUCING POWER TRANSMISSION BELT

[75] Inventors: Yoshitaka Tajima; Takamitsu Akashi, both of Kobe, Japan

[73] Assignee: Bando Chemical Industries, Ltd., Kobe, Japan

[21] Appl. No.: 09/010,483

[22] Filed: Jan. 21, 1998

Related U.S. Application Data

[62] Division of application No. 08/642,242, May 2, 1996, Pat. No. 5,746,674.

[51] Int. Cl.$^6$ ................................ F16G 1/10; F16G 3/10
[52] U.S. Cl. ................... 156/139; 156/137; 156/304.1; 156/304.3; 156/304.6; 152/324
[58] Field of Search ................................ 156/137, 139, 156/140, 141, 304.1, 304.3, 324, 304.6

[56] References Cited

U.S. PATENT DOCUMENTS

| | | |
|---|---|---|
| 4,096,764 | 6/1978 | Richmond et al. . |
| 4,276,039 | 6/1981 | Takano . |
| 4,283,455 | 8/1981 | McGee . |
| 4,296,640 | 10/1981 | Nosaka . |
| 4,618,387 | 10/1986 | Fisher et al. . |
| 4,737,138 | 4/1988 | Komai et al. . |
| 5,344,369 | 9/1994 | Kitahama et al. . |
| 5,454,761 | 10/1995 | Takahashi et al. . |

FOREIGN PATENT DOCUMENTS

| | | |
|---|---|---|
| 0481652 | 4/1992 | European Pat. Off. . |
| 0624738 | 11/1994 | European Pat. Off. . |
| 4-151048 | 5/1992 | Japan . |

*Primary Examiner*—Sam Chuan Yao
*Attorney, Agent, or Firm*—Sixbey Friedman Leedom & Ferguson; Gerald J. Ferguson, Jr.; Thomas W. Cole

[57] ABSTRACT

A top fabric is laminated with an adhesion rubber sheet made of an unvulcanized rubber sheet, which is located on the upper side from a cord of an adhesion rubber layer and forms an upper rubber portion of the adhesion rubber layer, thereby forming a band-shaped laminate. Both longitudinal ends of the band-shaped laminate are butt-jointed with each other so as to produce no level difference at the top surface of the top fabric and at the bottom surface of the adhesion rubber sheet. Thereby, the cord wound around the laminate in the subsequent step is embedded in the adhesion rubber layer without being displaced in level so that the obtained V-ribbed belt produces no abnormal vibration and no noise even if used in serpentine drive.

4 Claims, 4 Drawing Sheets

METHOD OF PRODUCING POWER TRANSMISSION BELT

This application is a divisional application of Ser. No. 08/642,242 filed on May 2, 1996 now U.S. Pat. No. 5,746,674.

BACKGROUND OF THE INVENTION

This invention relates to a power transmission belt and a method of producing the power transmission belt, and in particular relates to measures for abnormal vibration and noise production in the case that the belt is run in serpentine drive.

There is known a power transmission belt in which a top fabric is integrally adhered with the upper surface of an adhesion rubber layer. Such a power transmission belt is generally shaped like a cylinder by lap joint that both ends of the top fabric like a band are overlapped so as to put one on another and are jointed together. Therefore, the lap-jointed portion produces a level difference.

Figure 7:
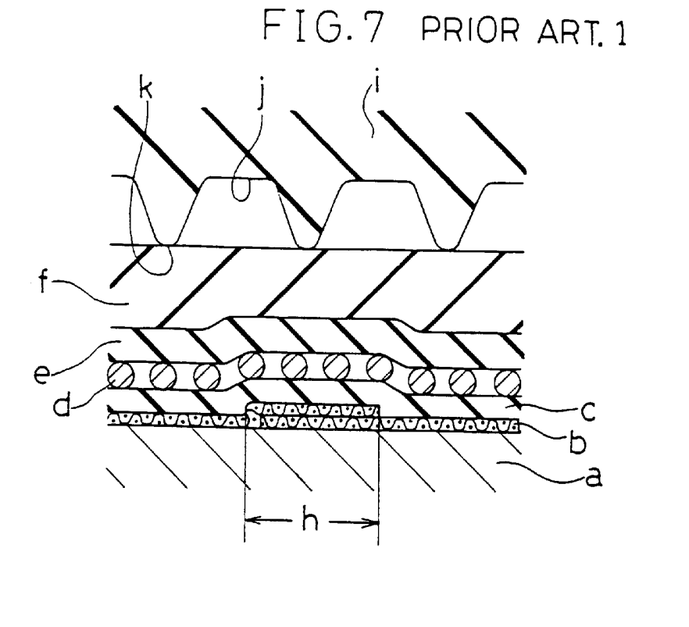
FIG. 7 is a diagram corresponding to FIG. 5 of Conventional Example 1 in which a top fabric is lap-jointed at both ends thereof.

In the case of forming a power transmission belt using the top fabric in which a level difference is produced, as shown in FIG. 7 (Prior Art 1), if the top fabric b is engaged with the outer periphery of a molding drum a and is wrapped in an adhesion rubber sheet c made of an unvulcanized rubber sheet, a cord d, another adhesion rubber sheet e made of an unvulcanized rubber sheet, and a rib rubber sheet f made of an unvulcanized rubber sheet in this order, the cord d may be displaced in level in correspondence with the level difference of a lap-jointed portion h of the top fabric b. Then, such a substance at this stage is press cured with a mold thereby forming a cylinder-shaped molded substance. The molded substance is then removed from the mold and is cut in a specific width thereby obtaining a power transmission belt. In the obtained power transmission belt, the cord d is embedded into the adhesion rubber layer with deviated from an adequate position.

If the power transmission belt mentioned above is used in serpentine drive that the belt is looped around a pulley so as to contact the belt back face with the pulley, the running of the belt becomes unsmooth. In detail, when the level difference portion passes the pulley, a problem that the power transmission belt abnormally vibrates and produces noise occurs.

FIG. 7 shows a V-ribbed belt as an example of a power transmission belt. In this figure, i indicates a sleeve made of elastic material such as rubber. The inner periphery of the sleeve is provided with a plurality of concavities j and convexities k for the formation of ribs.

To cope with the above problem, a power transmission belt and its producing method, as disclosed in Japanese Patent Application Laid-Open Gazette No.4-151048 (Prior Art 2), have been proposed in which both ends of a band-shaped fabric as a top fabric of the belt are butt-jointed, whereby an overlap of the top fabric which may cause deviation of the cord is eliminated so that no level difference can be produced at the jointed portion. This prevents the power transmission belt from abnormally vibrating and producing noise.

Figure 8:
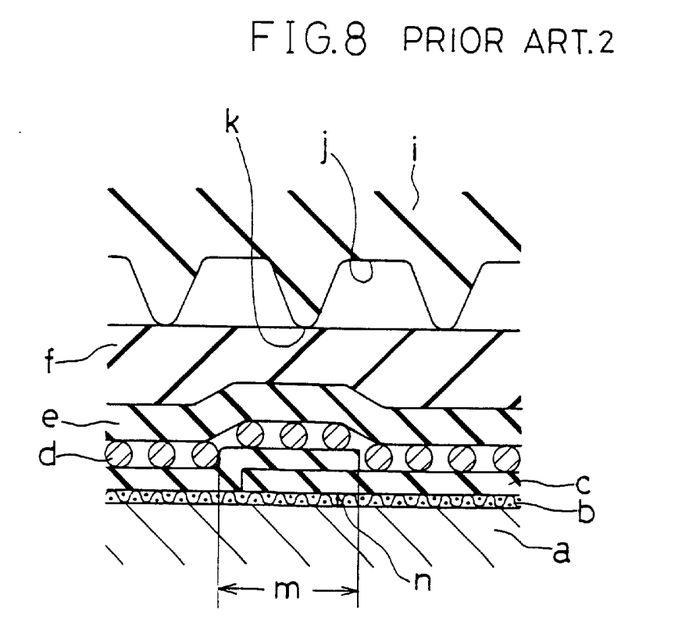
FIG. 8 is a diagram corresponding to FIG. 5 of Conventional Example 2 in which an adhesion rubber sheet is lap-jointed at both ends thereof.

However, even if a level difference at the jointed portion of the top fabric can be eliminated by butt joint as proposed above, an adhesion rubber sheet to be wound around the top fabric in molding is generally lap-jointed at both ends thereof as in the case of the top fabric of Prior Art 1 belt. Accordingly, as shown in FIG. 8, in molding, the cord d is displaced in level in correspondence with the level difference of a lap-jointed portion m of the adhesion rubber sheet e, so that in the obtained power transmission belt the cord d is embedded into the adhesion rubber layer with deviated from an adequate position as in Prior Art 1 belt. As a result, when the transmission belt is used in serpentine drive, it may abnormally vibrate and produce noise.

In FIG. 8, n indicates a butt-jointed portion of the top fabric b. Reference is made to the figure where like reference signs refer to like parts as in FIG. 7.

Further, the butt joint of the top fabric is much hard and inefficient because the top fabric is thin, as compared with the case that a thick substance is butt-jointed. For this reason, I suppose that the lap joint of the top fabric has yet been generally made.

SUMMARY OF THE INVENTION

In view of the foregoing problems, the present invention has been made. Therefore, the present invention has its object of eliminating a level displacement of the cord resulting from the level difference, in detail, the overlap of both ends of the top fabric and the overlap of both ends of the adhesion rubber sheet, to embed the cord in an adequate position of the adhesion rubber layer of a molded power transmission belt, whereby the belt can be smoothly driven in serpentine drive so that it can be prevented from abnormally vibrating and producing noise. Further, the present invention has another object of readily producing a power transmission belt which causes no abnormal vibration and produces no noise by realizing easy butt joint of the top fabric.

To attain the above objects, the present invention is characterized in that the top fabric which is a thin substance is butt-jointed not singly but as a thick substance combined with the adhesion rubber sheet.

More specifically, the present invention relates to a power transmission belt comprising: an adhesion rubber layer in which a cord is arranged at specific intervals in a belt width direction and is embedded along the length of the belt; and a top fabric adhered on the top surface of the adhesion rubber layer so as to be integral with the adhesion rubber layer, and relates to a method of producing the power transmission belt. The present invention has the following features.

First to fourth features of the present invention are directed to a power transmission belt. The first feature is that the top fabric is laminated with an adhesion rubber sheet made of an unvulcanized rubber sheet, which is located on the upper side from the cord of the adhesion rubber layer and forms an upper rubber portion of the adhesion rubber layer, to form a band-shaped laminate integral with the adhesion rubber sheet and that the band-shaped laminate formed of the top fabric and the adhesion rubber sheet is butt-jointed at both ends so as to be prevented from producing a level difference at the top surface of the top fabric and at the bottom surface of the adhesion rubber sheet.

The second feature is that in accordance with the first feature the band-shaped laminate is butt-jointed by seaming both ends of the band-shaped laminate.

The third feature is that in accordance with the first feature the band-shaped laminate is butt-jointed by thermally setting both ends of the band-shaped laminate.

The fourth feature is that in accordance with any one of the first to third features a plurality of rubber ribs are formed in one piece under the adhesion rubber layer so as to be arranged at specific intervals in a belt width direction and extend along the length of the belt.

Fifth to Eighth features are directed to a method of producing a power transmission belt. In the fifth feature, there is first prepared a band-shaped laminate in which an adhesion rubber sheet made of an unvulcanized rubber sheet is laminated integrally with one surface of the top fabric. The adhesion rubber sheet is to be located on the upper side from the cord of the adhesion rubber layer and to form an upper rubber portion of the adhesion rubber layer. Next, in producing the belt, both longitudinal ends of the band-shaped laminate are butt-jointed with each other so as to be prevented from causing a level difference at the top surface of the top fabric and at the bottom surface of the adhesion rubber sheet, thereby forming a cylinder-shaped laminate. Thereafter, the cylinder-shaped laminate is engaged with a molding drum from outward with the top fabric faced to the molding drum. The cord is spirally wound around the cylinder-shaped laminate, and an adhesion rubber sheet made of an unvulcanized rubber sheet and other belt components are wound around the cord in this order. The adhesion rubber sheet is to be located on the lower side from the cord of the adhesion rubber layer and to form a lower rubber portion of the adhesion rubber layer. Then, all the belt components wound around the molding drum are press cured thereby forming a cylinder-shaped molded substance. Thereafter, the molded substance is removed from the molding drum and is cut in a specific width thereby obtaining a power transmission belt.

The sixth feature is that in accordance with the fifth feature the band-shaped laminate is butt-jointed by seaming both ends of the band-shaped laminate.

The seventh feature is that in accordance with the fifth feature the band-shaped laminate is butt-jointed by thermally setting both ends of the band-shaped laminate.

The eighth feature is that in accordance with any one of the fifth to seventh features a plurality of rubber ribs are formed in one piece under the adhesion rubber layer so as to be arranged at specific intervals in a belt width direction and extend along the length of the belt.

As mentioned above, in the first to eighth features of the present invention, the top fabric is laminated with the adhesion rubber sheet made of an unvulcanized rubber sheet, which is located on the upper side from the cord of the adhesion rubber layer and forms the upper rubber portion of the adhesion rubber layer, to form a band-shaped laminate integral with the adhesion rubber sheet, and both the longitudinal ends of the band-shaped laminate are butt-jointed with each other by seaming or thermally setting them so as to be prevented from causing a level difference at the top surface of the top fabric and at the bottom surface of the adhesion rubber sheet.

Accordingly, the cord contacting the adhesion rubber sheet in molding produces no displacement due to level difference. When the molded substance formed in a specific form by press cure is removed from the molding drum and is cut in a specific width thereby obtaining a power transmission belt, the cord is embedded in an adequate position of to the adhesion rubber layer of the obtained power transmission belt without causing a displacement in level. The power transmission belt is smoothly run in serpentine drive and produces no abnormal vibration and no noise.

Further, since the top fabric is formed into a thick substance laminated with the adhesion rubber sheet and the thick substance is then butt-jointed, the butt joint can be easily made as compared with the case that the top fabric is butt-jointed singly as a thin substance so that a power transmission belt which produces no abnormal vibration and no noise can be readily obtained.

DESCRIPTION OF THE PREFERRED EMBODIMENT

Description is made below about an embodiment of the present invention with reference to the drawings.

Figure 1:
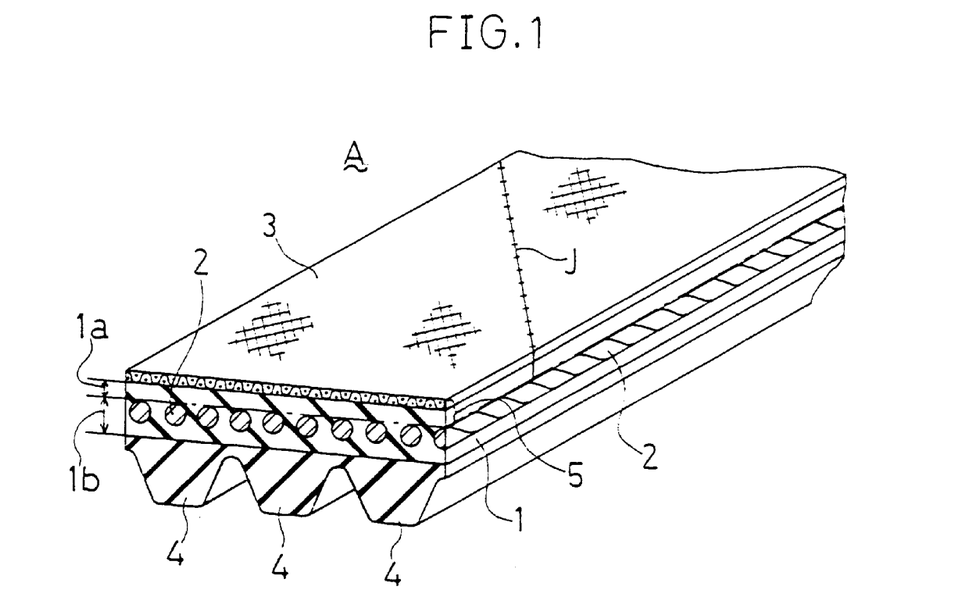
FIG. 1 is a perspective view partly showing a V-ribbed belt according to an embodiment of the present invention.

FIG. 1 shows a V-ribbed belt A as a power transmission belt according to an embodiment of the present invention. In this figure, reference numeral 1 indicates an adhesion rubber layer in which a cord 2 is arranged at specific intervals in a belt width direction and is embedded along the length of the belt. A top fabric 3 is adhered integrally with the top surface of the adhesion rubber layer 1. Three V-shaped rubber ribs 4 are formed in one piece on the bottom surface of the adhesion rubber layer 1 so as to be arranged at specific intervals in a belt width direction and extend along the length of the belt. In this manner, the V-ribbed belt A is composed.

In one of features of the present invention, which will be apparent from the below-mentioned description about a belt producing method, the top fabric 3 is laminated in the form of a band integral with an adhesion rubber sheet 1'a made of an unvulcanized rubber sheet. The adhesion rubber sheet 1'a is located on the upper side from the cord 2 of the adhesion rubber layer 1 and forms an upper rubber portion 1a of the adhesion rubber layer 1. Both longitudinal ends of the top fabric 3 are butt-jointed with each other together with the adhesion rubber sheet 1'a so as to be prevented from causing a level difference at the top surface of the top fabric 3 and at the bottom surface of the adhesion rubber sheet 1'a. In other words, the top fabric 3 is laminated integrally with the adhesion rubber sheet 1'a made of an unvulcanized rubber sheet, which is located on the upper side from the cord 2 of the adhesion rubber layer 1 and forms an upper rubber portion 1a of the adhesion rubber layer 1, to form a band-shaped laminate 5, and the band-shaped laminate 5 is then treated for the formation of a V-ribbed belt (See FIG. 2).

Figure 5:
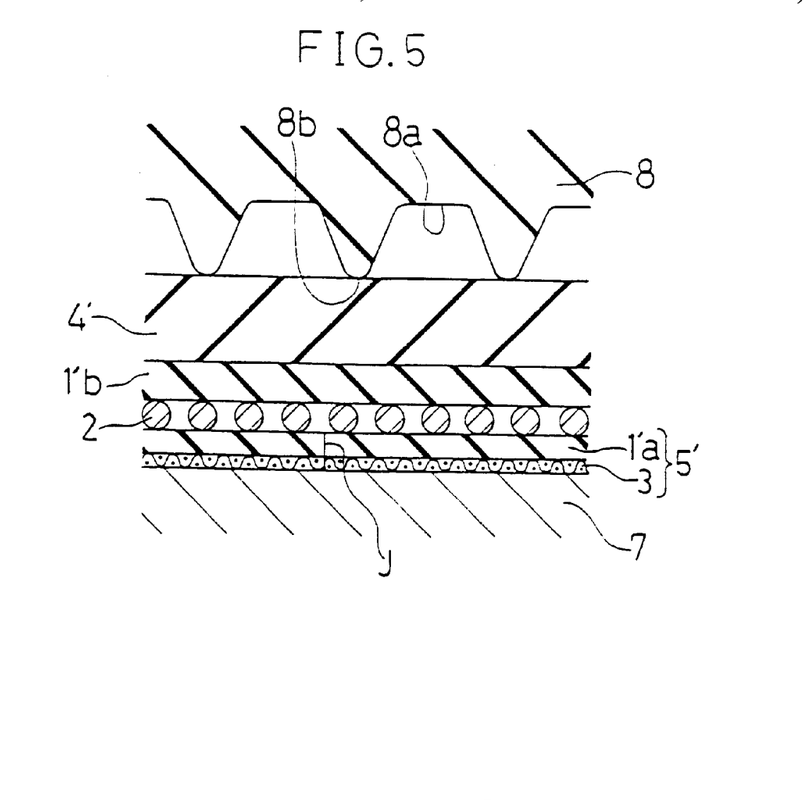
FIG. 5 is a diagram corresponding to a cross section taken along the V—V line of FIG. 4, in which belt components of the above embodiment are set between a mold and a sleeve.

In molding the belt, both longitudinal ends of the band-shaped laminate 5 formed of the top fabric 3 and the adhesion rubber sheet 1'a are butt-jointed with each other, i.e., both longitudinal ends of the top fabric 3 and both ends of the adhesion rubber sheet 1'a are butt-jointed, so that no level difference occurs at the top surface of the top fabric 3 and the bottom surface of the adhesion rubber sheet 1'a. The butt joint may be made by way of seaming both ends of the band-shaped laminate 5 with an over-lock sewing machine or by way of thermally setting both ends of the band-shaped laminate 5. The thermoset is made in such a manner as to abut both ends of the adhesion rubber sheet 1'a on each other and apply heat to both the abutted ends. In FIG. 5, J indicates the butt-jointed portion.

In FIG. 1, the butt joint is made by a diagonal butt joint that butt-joints both ends of the band-shaped laminate 5 diagonally with respect to the longitudinal direction of the belt. However, the butt joint may be made in such a manner that both ends are butt-jointed at a right angle with respect to the longitudinal direction of the belt.

The cord 2 is formed by twisting fibers such as polyester fibers, polyamide fibers, aramid fibers and glass fibers together to form a suitable cord according to the belt use and subjecting the twisted cord to heat drawing treatment and adhesion treatment.

As shown in FIG. 5, at the stage before molding, the adhesion rubber layer 1 is composed of adhesion rubber sheets 1'a and 1'b each made of an unvulcanized rubber sheet. The unvulcanized rubber sheet forming each of the adhesion rubber sheets is composed of an elastic rubber member made of compounded rubber that additive is suitably added to, for example, chloroprene rubber (CR), styrene-butadiene rubber (SBR), acrylonitrile-butadiene rubber (NBR), natural rubber (NR) or a rubber blend of these rubbers according to the belt use.

The thickness of the adhesion rubber sheet 1'a forming the upper rubber portion 1a may be set to 0.4 to 0.6 mm. However, the thickness of the adhesion rubber sheet 1'a is not limited to that range and can be set in view of workability in butt joint. The lamination of the adhesion rubber sheet 1'a on the top fabric 3 may be made by topping that the top fabric 3 and the adhesion rubber sheet 1'a are passed between a pair of calendar rolls 6 (See FIG. 2).

The top fabric 3 is made by weaving cotton yarns, nylon yarns or the like. It is essential only that the top fabric 3 is a fabric commonly used for power transmission belt.

The ribs 4 is made of the same rubber as the adhesion rubber layer 1.

Next, description is made about the details of a method of producing the V-ribbed belt A having the above-mentioned structure.

Figure 2:
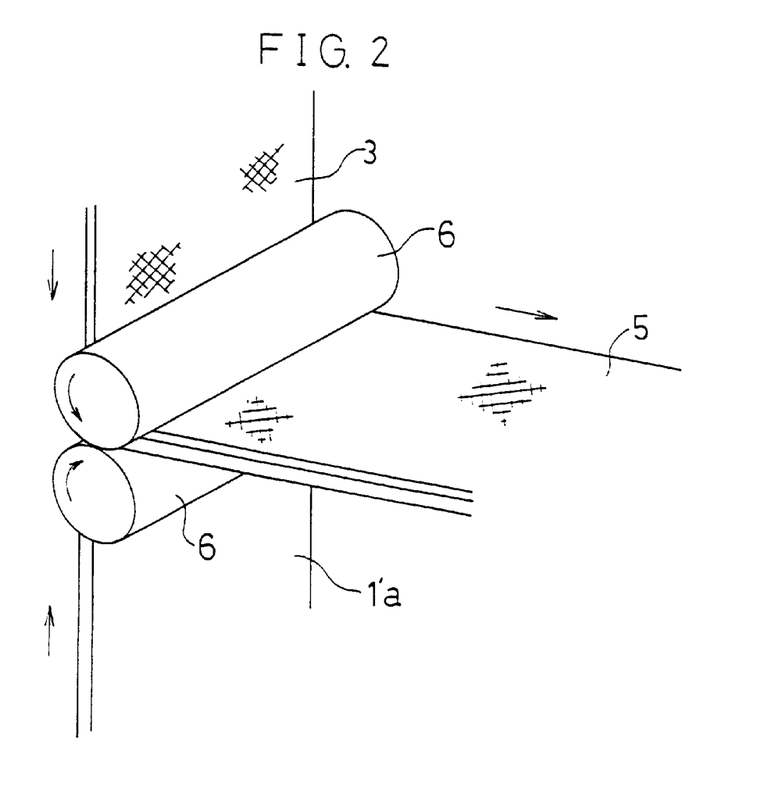
FIG. 2 shows a process of topping an adhesion rubber sheet with a top fabric.

First, there is prepared a band-shaped laminate 5 in which an adhesion rubber sheet 1'a made of an unvulcanized rubber sheet, which is to be located on the upper side from the cord 2 of the adhesion rubber layer 1 and forms an upper rubber portion 1a of the adhesion rubber layer 1, is laminated with one surface of the top fabric 3. As shown in FIG. 2, the band-shaped laminate 5 is made in such a manner that the top fabric 3 and the adhesion rubber sheet 1'a are laminated in one piece by passing the top fabric 3 and the adhesion rubber sheet 1'a between a pair of calendar rolls 6 so as to be pressed therebetween.

Figure 3:
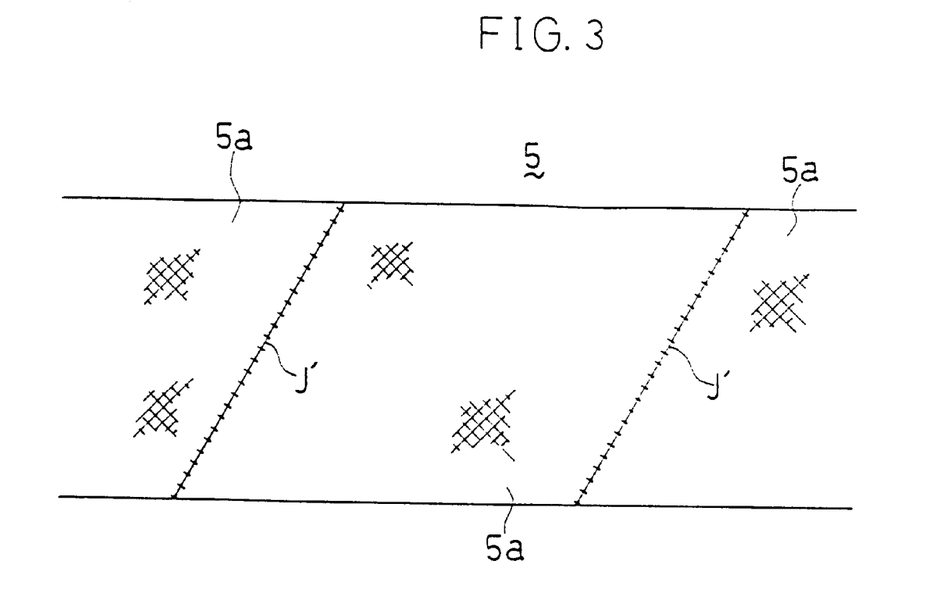
FIG. 3 is a plan view of a band-shaped laminate formed by cutting an original band-shaped laminate on the bias into plural pieces and seaming them.

Then, as shown in FIG. 3, the band-shaped laminate 5 is cut on the bias into plural pieces 5a so that the warp yarns and the weft yarns can be oriented at a specific angle with respect to the longitudinal direction of the belt. The resulting plural pieces 5a are sequentially butt-jointed by seaming them with an over-lock sewing machine thereby forming a band-shaped laminate 5 again. In the figure, J' indicates the butt-jointed portion.

Thereafter, both the longitudinal ends of the band-shaped laminate 5, formed of the top fabric 3 and the adhesion rubber sheet 1'a, are abutted on each other so as to produce no level difference at the top surface of the top fabric 3 and the bottom surface of the adhesion rubber sheet 1'a and are jointed by seaming both the longitudinal ends of the band-shaped laminate 5 with an over-lock sewing machine or the like.

Figure 4:
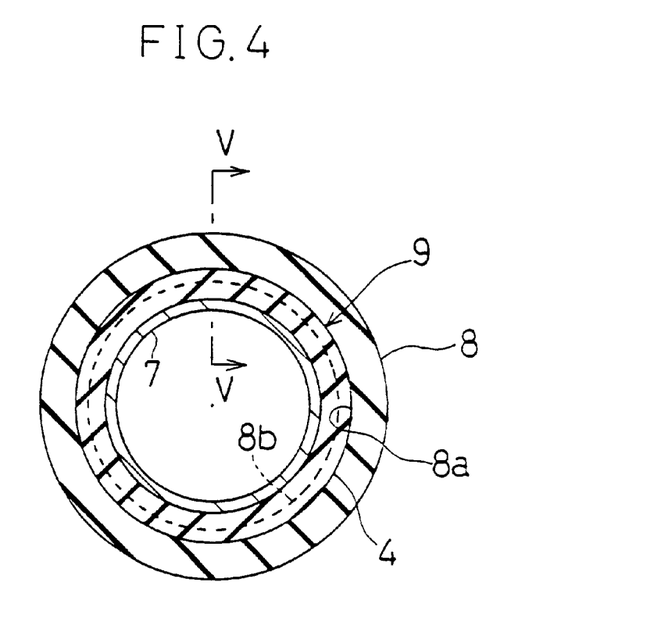
FIG. 4 is a cross section showing the interior of a molding device immediately after a molded substance as a semifinished product of the V-ribbed belt of the above embodiment is molded.

Then, as shown in FIGS. 4 and 5, the resulting cylinder-shaped laminate 5' formed like a cylinder by the butt joint is engaged with the cylinder-shaped molding drum 7 from outward with the top fabric 3 faced to the molding drum 7, the cord 2 is spirally wound around the laminate 5', and the adhesion rubber sheet 1'b made of an unvulcanized rubber sheet and the rib rubber sheet 4' as another belt component made of an unvulcanized rubber sheet are wound in this order. The adhesion rubber sheet 1'b is designed to be located on the upper side from the cord 2 of the adhesion rubber layer 1 and to form a lower rubber portion 1b of the adhesion rubber layer 1. Thereafter, a cylinder-shaped sleeve 8 made of elastic material such as rubber in which concavities 8a and convexities 8b are formed at the inner periphery so as to correspond to the form of the ribs 4, is engaged with the molding drum 7 from outward. All the belt components around the molding drum 7 are then press cured so that a cylinder-shaped molded substance 9 is formed.

Thereafter, the cylinder-shaped molded substance 9 is removed from the mold and is cut in a specific width, thereby obtaining a V-ribbed belt A as shown in FIG. 1. In the V-ribbed belt A, the top fabric 3 is adhered integrally with the top surface of the adhesion rubber layer 1, and three V-shaped ribs 4 are formed in one piece on the bottom surface of the adhesion rubber layer 1 so as to be arranged at specific intervals in a belt width direction and extend along the length of the belt. In the adhesion rubber layer 1, the cord 2 is arranged at specific intervals in the belt width direction and is embedded along the length of the belt. The ribs 4 of the V-ribbed belt A are faced outward immediately after the belt is produced. For actual use, the belt A is turned inside out so as to direct the ribs 4 outside.

In the V-ribbed belt A thus obtained, the butt-jointed portion J of the fabric member forming the top fabric 3 has a flat surface without a level difference. The adhesion rubber sheet 1'a as the lower layer of the band-shaped laminate 5 is formed, by press cure, in one piece together with the adhesion rubber sheet 1'b as the lower rubber portion 1b of the adhesion rubber layer 1 thereby forming a single adhesion rubber layer 1.

In the V-ribbed belt A of this embodiment produced mentioned above, the actual distance from the belt back face to the cord was 1.02 to 1.07mm while the design distance was 1.05mm, as shown in Table 1. Respective magnitudes of abnormal vibration and noise when a belt was driven in serpentine drive were checked in each case of using the V-ribbed belt A, the belt of Prior Art 1 and the belt of Prior Art 2. The results are shown in Table 1. Prior Art 1 shows the case that the top fabric 3 was lap-jointed and the adhesion rubber sheet 1'a also lap-jointed. Prior Art 2 shows the case that the adhesion rubber sheet 1'a was lap-jointed but the top fabric 3 butt-jointed.

TABLE 1

|  | Prior Art 1 | Prior Art 2 | This Embodiment |
|---|---|---|---|
| Joint manner Top fabric | Lap joint | Butt joint | Butt joint |
| Adhesion rubber sheet | Lap joint | Lap joint | Butt joint |
| Distance from belt back face to cord (mm) Dsgn. distance: 1.05 mm | 1.30 to 1.40 | 1.10 to 1.20 | 1.02 to 1.07 |
| Number of steps of producing belt | 100 | 105 | 90 |
| Magnitude of abnormal vibration | Large | Small to Medium | Nothing |
| Magnitude of noise | Large | Small to Medium | Nothing |

As is evident from Table 1, the V-ribbed belt of this embodiment produced neither abnormal vibration nor noise. However, in the belt of Prior Art 1, the distance from the belt back face to the cord was 1.30 to 1.40 mm and the value indicates significant displacement in level as compared with this embodiment. Both the magnitudes of abnormal vibration and noise were large. In the belt of Prior Art 2, the distance from the belt back face to the cord was 1.10 to 1.20mm, and the amount of displacement in level was smaller than that of Prior Art 1 but larger than that of this embodiment. Both the magnitudes of abnormal vibration and noise were still produced though they were smaller than that of Prior Art 1.

Figure 6:
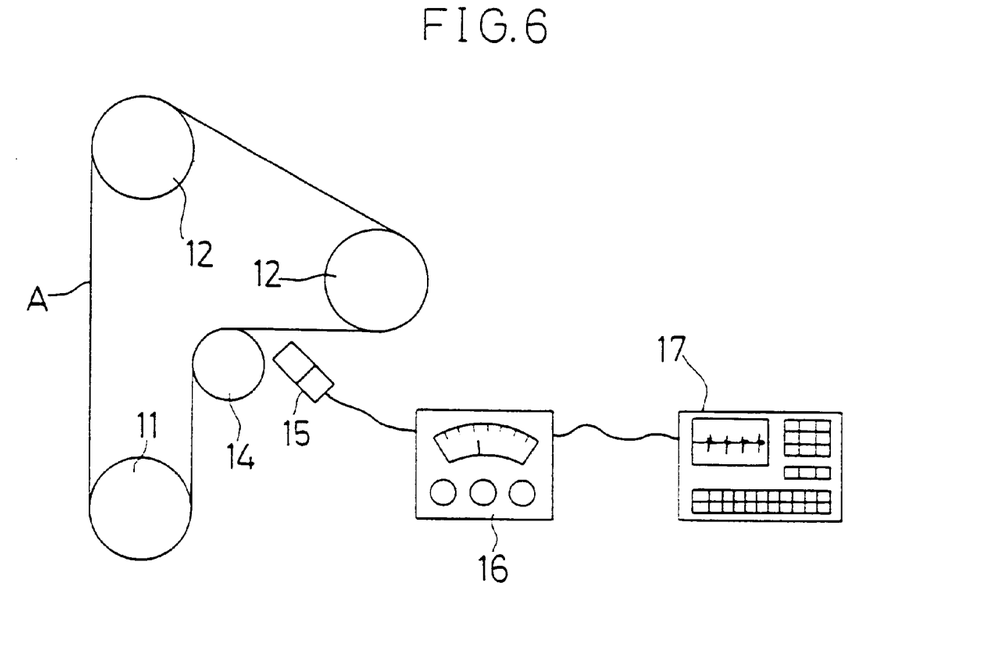
FIG. 6 is a diagram schematically showing the structure of a test machine for checking whether the V-ribbed belt has produced noise in serpentine drive.

The test for checking noise was conducted as follows: First, as shown in FIG. 6, a V-ribbed belt A as a sample was looped around a driving pulley 11 and driven pulleys 12 and was then run by an idler 14 under a tension of 120 kgf. A highly directional microphone 15 was placed near the idler 14 which is rotated in serpentine drive at the running state of the belt. The sound collected by the highly directional microphone 15 was measured by a sound level meter 16 and a recorder 17. The driving pulley 11 and the driven pulleys 12 all have the same size of 100 mm diameter. The diameter of the idler 14 is 70 mm. The number of rotations of the driving pulley 11 is 1000 rpm.

The reason why this embodiment produces neither abnormal vibration nor noise is as follows: The top fabric 3 and the upper rubber portion 1a (adhesion rubber sheet 1'a) of the adhesion rubber layer 1 are each butt-jointed and therefore the butt-jointed portion J is flat and produces no level difference. Thereby, in molding, the cord 2 is wound substantially in a circle around the upper rubber portion 1a with no level displacement produced. As a result, the cord 2 is arranged in an adequate position of the adhesion rubber layer 1 of the molded V-ribbed belt A. This allows the V-ribbed belt A to smoothly pass the idler 14 without producing abnormal vibration and noise.

On the other hand, in Prior Art 1, the top fabric 3 and the upper rubber portion 1a (adhesion rubber sheet 1'a) of the adhesion rubber layer 1 are each lap-jointed. In Prior Art 2, the upper rubber portion 1a (adhesion rubber sheet 1'a) of the adhesion rubber layer 1 is lap-jointed. Therefore, both the jointed portions of Prior Arts 1 and 2 are not flat but produce level differences. Accordingly, in Prior Arts 1 and 2, when the cord 2 is wound around the upper rubber portion 1a in molding, it is displaced in level without being wound in a circle. Thereby, the cord 2 cannot be arranged in an adequate position of the adhesion rubber layer 1 of the molded V-ribbed belt A. As a result, the V-ribbed belt A cannot smoothly pass the idler 14 and produces abnormal vibration and noises.

Further, in this embodiment, since the butt joint of the top fabric 3 is made not singly but in the form of a thick substance combined with the adhesion rubber sheet 1'a, it can be readily accomplished as compared with the case that the top fabric 3 as a thin substance is singly butt-jointed, thereby readily obtaining a V-ribbed belt A which produces no abnormal vibration and no noise.

In this embodiment, the power transmission belt is a V-ribbed belt A. Power transmission belts of any kind can be applied to the present invention, limited only in that they each have a top fabric 3 on the belt back face.

According to the present invention, as mentioned above, since the top fabric is butt-jointed at both ends thereof by seaming or thermally setting both the ends, with laminated with the adhesion rubber sheet as an upper rubber portion of the adhesion rubber layer, so as to produce no level difference, the cord can be embedded in an adequate position of the adhesion rubber layer of the power transmission belt without being displaced in level. This allows the power transmission belt to smoothly run in serpentine drive without producing abnormal vibration and noise.

Further, since the top fabric is butt-jointed in the form of a thick substance combined with the adhesion rubber sheet, the butt joint of the top fabric can be readily made as compared with the case that the top fabric is butt-jointed singly in the form of a thin substance, thereby readily obtaining a power transmission belt which produces no abnormal vibration and no noise.

What is claimed is:

1. A method of producing a power transmission belt that includes:
    an adhesion rubber layer in which a cord is arranged at specific intervals in a belt width direction and is embedded along the length of the belt; and a top fabric adhered on a top surface of the adhesion rubber layer so as to be integral with the adhesion rubber layer,
    said method comprising the steps of:
        preparing a band-shaped laminate in which an adhesion rubber sheet made of an unvulcanized rubber sheet is laminated integrally with one surface of the top fabric, said adhesion rubber sheet being located on an upper side of the cord of the adhesion rubber layer to form an upper rubber portion of the adhesion rubber layer;
        butt joining longitudinal ends of the band-shaped laminate with each other so as to prevent the occurrence of a level difference at a top surface of the top fabric and at a bottom surface of the adhesion rubber sheet in forming a cylinder-shaped laminate;
        engaging the cylinder-shaped laminate with a molding drum from outward with the top fabric faced to the molding drum, spirally winding the cord directly around the cylinder-shaped laminate, winding an adhesion rubber sheet made of an unvulcanized rubber sheet around the spirally-wound cord to form a belt laminate, said adhesion rubber sheet being located on a lower side from the cord of the adhesion rubber layer to form a lower rubber portion of the adhesion rubber layer, then press curing the belt laminate wound around the molding drum to thereby form a cylinder-shaped molded article; and removing the molded article from the molding drum and cutting the molded article in a specific width to obtain a power transmission belt.

2. A method of producing a power transmission belt according to claim 1, wherein the band-shaped laminate is butt-jointed by seaming both ends of the band-shaped laminate.

3. A method of producing a power transmission belt according to claim 1, wherein the band-shaped laminate is butt-jointed by thermally setting both ends of the band-shaped laminate.

4. A method of producing a power transmission belt according to any one of claims 1 to 3, wherein a plurality of rubber ribs are formed in one piece under the adhesion rubber layer at specific intervals in a belt width direction and extend along the length of the belt.

* * * * *

UNITED STATES PATENT AND TRADEMARK OFFICE
CERTIFICATE OF CORRECTION

PATENT NO. : 5,961,760
DATED : October 5, 1999
INVENTOR(S) : YOSHITAKA TAJIMA and TAKAMITSU AKASHI It is certified that error appears in the above-identified patent and that said Letters Patent is hereby corrected as shown below:

On the title page, item

[30]   Foreign Application Priority Data

May 11, 1995      [JP]    Japan         7-112906

Signed and Sealed this

Twenty-seventh Day of March, 2001

*Attest:*

NICHOLAS P. GODICI

*Attesting Officer*     *Acting Director of the United States Patent and Trademark Office*